United States Patent [19]

Lee et al.

[11] Patent Number: 4,710,319
[45] Date of Patent: Dec. 1, 1987

[54] AUTOFLUOROGRAM COMPOSITION

[75] Inventors: Duk-Hi Lee, Wellesley; Susan E. Feierberg, Belmont; Patricia Mayer, Burlington, all of Mass.

[73] Assignee: E. I. Du Pont de Nemours and Company, Wilmington, Del.

[21] Appl. No.: 796,068

[22] Filed: Nov. 8, 1985

[51] Int. Cl.$^4$ .................... C09K 11/04; C09K 11/06; G21H 5/02
[52] U.S. Cl. .................... 252/646; 204/182.8; 250/303; 252/301.16; 252/301.17; 252/301.35; 252/408.1; 252/645; 422/61; 430/139; 430/495
[58] Field of Search .................... 252/646, 645, 301.16, 252/301.21, 301.27, 301.28, 301.34, 301.35, 301.17, 645, 408.1, 301.24; 204/182.8, 180.1; 430/139, 495; 250/303; 548/235; 424/1.1; 422/61

[56] References Cited

U.S. PATENT DOCUMENTS

| | | | |
|---|---|---|---|
| 4,157,913 | 6/1979 | Okazaki et al. | 252/301.24 |
| 4,157,914 | 6/1979 | Okazaki et al. | 252/301.24 |
| 4,167,628 | 9/1979 | Kormany | 252/301.24 |
| 4,208,513 | 6/1980 | Burdeska | 542/459 |
| 4,293,436 | 10/1981 | Fost | 252/301.1 R |
| 4,522,742 | 6/1985 | Lee et al. | 252/301.16 |

OTHER PUBLICATIONS

Bonner & Stedman, Anal. Biochem., 89, 247–256, (1978).
Bonner & Laskey, Eur. J. Biochem., 46, 83–88, (1974).
Chamberlain, John P., Anal. Biochem., 98, 132–135, (1979).

*Primary Examiner*—John F. Terapane
*Assistant Examiner*—Howard J. Locker

[57] ABSTRACT

The subject invention provides an autofluorography kit composition comprising (i) a first aqueous solution of a water soluble fluor having a formula selected from $R-CO_2-X$; $R-SO_3-X$; and $R-NH_3-Y$; where X and Y are any counterion capable of imparting water solubility, and R is a fluor molecule; and (ii) a second aqueous solution of a precipitator capable of precipitating the water soluble fluor in an electrophoresis gel matrix.

3 Claims, No Drawings

AUTOFLUOROGRAM COMPOSITION

FIELD

The subject invention relates to autofluorographic compositions useful in the enhancement of the detection signal given by radioactively labelled substances.

BACKGROUND

Autoradiography is the production of an image in a photographic emulsion by a relatively labelled substance. Autoradiography is an important method in biological, biochemical and clinical investigation and analyses. The isotopes most often used with this technique are 3H, 14C, 35S, 125I, and 32P. The low energy of the disintegration particles of 3H, 14C and 35S prevents the efficient exposure of the X-ray film used to detect this radioactivity. The researcher must use large amounts of radioactivity or very long film exposure times.

To overcome the problems of sensitivity and long exposure times, researchers incorporate scintillators (or fluors) into their separation media. After the mixtures of radioactively labelled samples are separated by conventional separation techniques, the fluors are applied to the media. The radiation energy emitted by the unstable isotopes is absorbed by the fluors present in the system and these fluors emit light at a specific wavelength. The light given off by the fluors exposes the film much more efficiently than the radiation energy itself. This detection method is commonly known as fluorography.

Fluorography is useful with a wide variety of separation media. For example, in chromatography and electrophoresis, the radioactive material to be detected is absorbed or adsorbed according to conventional techniques in or on an organic or inorganic absorbent or adsorbent layer or column of separation medium or material, e.g. silica gel, alumina, cellulose, polyamide, polyacrylamide, cross-linked dextran, agarose, nylon, nitrocellulose, etc., which is usually supported on a plate, e.g. glass or plastic sheet.

In spite of its importance, fluorography is not an easy method to apply. In the case of thin layer chromatography, the fluor is dissolved in a suitable carrier solvent and then sprayed onto the thin layer separation medium, e.g., a paper strip containing a radioactive sample. After the carrier solvent has been evaporated, the chromatogram is placed in direct contact with the photographic emulsion. This sandwich is left undisturbed for a sufficient time to achieve exposure. This method works because the layer is so thin that the radioactive emitters are close enough to the surface to interact with a surface layer of fluor. However, in such a system, it is difficult to evenly distribute the fluor, the radioactive material may be spread and diffused by the carrier solvent, and the small crystals of fluor tend to be so loosely bound that great care must be exercised in handling the sample.

Further, it is often desirable to employ a separation medium which is thicker, i.e. greater than about 0.1 mm. In this case, the technique of coating the surface by spraying is no longer adequate. The isotopes used in these techniques have a relatively low energy and, therefore, the radiation has short path length. It is, therefore, necessary for the fluor to be in close proximity to the radioactive label such that the radiation energy will interact with the fluor and thus be amplified. In relatively thick layers, it is necessary to uniformly impregnate the layer with fluors. If the separation media is coated on the surface only, the vast majority of the disintegration particles will be absorbed before they reach the fluors or the film and go undetected. Accordingly, it is necessary to somehow uniformly transport the fluor into this interior of the separation medium. One method for accomplishing this transportation is by soaking the separation medium of absorbent or adsorbent material in a bath containing the fluor dissolved in a suitable carrier.

Many methods for incorporating fluors into separation media appear in the literature. Three methods used for thin layer chromatography are described in Bonner and Stedman, Anal. Biochem., Vol. 89, 247–256, (1978) incorporated herein by reference.

The first method uses 2-methylnaphthalene, which is described as being a scintillation solvent for use in solid systems by analogy to scintillation fluids, which many times contains a solvent in addition to the scintillator. As in liquid systems, the solvent molecules collect the energy from the emitted beta radiation and transfer it to 2,5-diphenyloxazole molecules, which emit photons of light at the proper wavelength to expose the X-ray film. This method comprises dipping the dried, thin-layer plates in a solution of 2-methylnaphthalene which has been melted and which contains 0.4% (w/v) of 2,5-diphenyloxazole until they are soaked and then removing the plates from the solution. When the solution cools and solidifies, the plate is placed against film and exposed. An alternative, if spraying is more desirable, is to replace 10% of the 2-methylnaphthalene with toluene to make the solution a liquid at room temperature.

The second method involves dipping the plates in an ether solution containing between 7% and 30% (w/v) of 2,5-diphenyloxazole, drying the plates and exposing to film, with better sensitivity being seen as the 2,5-diphenyloxazole (or PPO) concentration increases.

The third method involves dipping the thin layer plate in melted PPO until soaked, removing and then heating until the excess PPO has drained off, and exposing to film as above.

These methods are helpful for thin layer chromatography, but have serious drawbacks when applied to gel electrophoresis. The gels used generally contain >80% water and more often >90% water. The fluors and solvents used in these methods are not water soluble or water miscible. This will prevent efficient and uniform transport of the fluors to the interior of the gel. The fluors tend to precipitate on the surface of the gel. The suggested organic solvents cause drastic shrinkage of the gel, prevent impregnation, and lead to distortion of the gel.

One method for increasing the absorption ability of 2,5-diphenyloxazole is to use scintillation solvents. The solvent molecules which are more efficient absorbers of energy from the emitted beta radiation convert the energy to photons of light, and transfer it to 2,5-diphenyloxazole molecules which then emit photons of light detected by X-ray films. This method is described by Bonner and Stedman in Anal. Biochem. Vol. 89, pages 247–256, (1978), for thin layer chromatography. One problem is that neither 2,5-diphenyloxazole nor 2-methylnaphthalene, the combination of fluors described by Bonner and Stedman, is soluble nor miscible in water to any appreciable extent. Accordingly aqueous polyacrylamide or agarose gels are not impregnated with 2,5-diphenyloxazole or 2-methyl naphthalene while in the hydrated state.

Dennis C. Fost, U.S. Pat. No. 4,293,436, Oct. 6, 1981 described a highly sensitive and efficient autofluorographic technique for weak radioactive emitters by impregnating the aqueous separation medium, including electrophoresis gels, with a water-soluble or water-miscible lower alkyl carboxylic acid and alcohol combination in which a scintillator fluor has been dissolved, followed by precipitation of the fluor within the gel by aqueous soaking. However, this procedure suffers from disadvantages. The organic solvents of the impregnation step shrink the gel. The water used in the precipitation step then causes the gel to expand. This distortion can adversely affect the resolution of the image produced.

Another fluorographic system has been described in U.S. Pat. No. 4,522,742, issued June 11, 1985 to Lee, Feierberg and O'Brien. In that method, the aqueous separation medium to be subjected to fluorography is impregnated in an aqueous autoflourographic enhancer containing water soluble fluors which eliminate the problems associated with the impregnation of gels, and permit wider and more convenient use of fluorography. This water-based system does not, however, work effectively in very thin gels (<1.0 mm) or gels with <5% acrylamide or agarose. Unlike the systems based on organic solvent impregnation and water precipitation, this aqueous system transports the fluors into the gel without exchanging the solvent and without precipitating the fluors. Prior to film exposure, the gels must be dried. The most common technique involves drying the gel onto a piece of filter paper with heat and vacuum. As soon as the vacuum is applied, the majority of the water is suctioned out of the gel rather than evaporated; and some of the water soluble fluor is pulled out with the water. For gels with a small mass, enough fluor is pulled out to seriously decrease the enhancement of the film exposure.

It is the purpose of the invention to create a new system where the fluors are precipitated within the gel using only aqueous solutions, thus having the advantages of precipitated fluors without the disadvantages of hazardous organic solvents.

SUMMARY

The subject invention provides an autofluorography kit composition comprising (i) a first aqueous solution of a water soluble flour having a formula selected from $R-CO_2-X$; $R-SO_3-X$; and $R-NH_3-Y$; where X and Y are any counterion capable of imparting water solubility, and R is a fluor molecule; and (ii) a second aqueous solution of a precipitator capable of precipitating the water soluble fluor in an electrophoresis gel matrix.

DETAILED DESCRIPTION

The subject invention is a method for impregnating electrophoresis gels with an aqueous solution of fluors, and an autofluorography composition for practicing the method. Once transported into the gel, the fluor is precipitated throughout the gel.

The present invention uses two aqueous solutions: a water soluble fluor solution and a precipitator solution.

The water soluble fluors will take the general form of:

$R-CO_2-X$; $R-SO_3-X$, or $R-NH_3-Y$ where X and Y are any counter ion which imparts a high degree of water solubility to the compound, examples of which are:

for X: $H+$, $Na+$, $NH_4+$, etc.

for Y: $OH-$, $Cl-$, etc.; and R is the fluor portion of the molecule. The fluor portion of the molecule may be derived from any of the known fluors which efficiently collect the radiation from the $\beta$ emitters and emit light at a wavelength corresponding to the sensitivity of the X-ray film. Preferred fluors are those which are stable and have a high quantum yield, and most preferably at least one fluor in the composition of the present invention has a quantum yield above 0.5. For example, the fluors useful herein are derivatives of substituted or unsubstituted 2,5diphenyloxazole (or PPO), e.g., 2,5-diphenyl-4-methyloxazole; naphthalene and its derivatives, e.g. 1-methyl naphthalene; terphenyl and its unsubstituted or substituted isomers, e.g., m-terphenyl, 3,3'-dimethyl-p-terphenyl; fluorene and its derivatives, sodium salicylate and derivatives of other fluors known per se in the art. See Berlman, HANDBOOK OF FLUORESCENCE SPECTRA OF AROMATIC MOLECULES, Academic Press, NY (1971), the disclosure of which is hereby incorporated herein by reference. A wide range of concentrations will give good results (i.e., from 10mM to 1M, preferably 200mM to saturation). Presently preferred fluors are derivatives of PPO and naphthalene. Highly advantageous results can be obtained with compositions containing combinations of derivatives of naphthalene and PPO.

The preferred water soluble fluor compositions are 4-(5-(2-phenyloxazolyl) benzene sulfonic acid (ammonium salt), and 2-naphthalene-sulfonic acid, (ammonium salt). The preferred concentrations for this fluor solution are 20mM 4-(5-(2-phenyloxazolyl)) benzene sulfonic acid (ammonium salt) and 400mM 2-naphthalene-sulfonic acid (ammonium salt).

The second solution in this system is the precipitator solution. The composition of this solution depends on the type of water soluble fluor used. When the fluor takes the form of $R-CO_2-X$ or $R-SO_2-X$, the precipitator solution may consist of such salts as $MgZ_2$, $CaZ_2$, $BaZ_2$, $CdZ_2$, $NH_4Z$, $NaZ$, etc, where Z may be $-Cl$, $-OAc$, etc., in concentrations of 0.1M to 1.0M, preferably 0.4M to 0.8M. In such systems, the precipitating agent can also be an amine or quaternary ammonium salt, examples of which are poly(ethylenimine) in concentrations of 0.1% to 5%, preferably 0.5% to 3%.; N-[4-(2,5diphenyloxazolyl)methyl]ammonium chloride; N-(1-naphthylmethyl) ammonium chloride; N-(4-(2,5-di-phenyloxazolyl)methyl)trimethyl ammonium chloride; etc, the ammonium salt concentrations generally being in the ranges useful for the fluor concentrations, as described hereinbefore. When the fluors take the form $R-NH_3Y$, the precipitator will have a structure $R'-SO_3X$ or $R'-CO_2X$ where $R'$ can be any organic moiety which, when reacted with $R-NH_3Y$, results in the desired $RNH_3SO_3R'$ precipitate, examples of which are the fluors detailed above, or sodium dodecyl sulfate. Again, a wide range of concentrations produces good precipitation, as detailed above.

The preferred precipitator for the preferred water soluble fluor composition is poly(ethyleneimine). A wide range of polymer chain lengths give excellent results. Advantageous results can be obtained using a poly(ethyleneimine) of approximately 200–10,000 MW, preferably 600–2,000 MW. As seen in the Examples below, a high degree of enhancement was achieved using a 2% (w/w) solution of the poly(ethyleneimine).

The compositions of the present invention can be obtained from commercially available products, by reactions which the skilled in the art will readily appreciate in the light of the present disclosure. For example, where the fluor contains an aryl group or other group which can be readily sulfonated, it can be sulfonated to yield the water soluble aryl sulfonic acid in the manner (fuming sulfuric acid) described by Lee, Feierberg and O'Brien, U.S. Pat. No. 4,522,742, June 11, 1985. The ammonium salts of aryl sulfonates are then made by reacting the sulfonic acid compounds with excess ammonium hydroxide.

When the water soluble scintillation compositions are impregnated into the gel they form insoluble salts with the precipitator solution, or in the case of poly(ethyleneimine) they form insoluble macromolecules with the precipitator solution. Therefore, upon drying the impregnated gel, the scintillation composition remains in the gel and enhancement of radioactivity occurs. This scintillation composition can be used in all electrophoresis gel separation media. The gels may be treated with the fluor solutions and the precipitator solution in any order.

The scintillator compositions of the present invention can advantageously contain a number of other materials. In addition to a water soluble primary flour, the scintillator composition can contain a secondary fluor, or wavelength shifter, which absorbs light at the wavelengths emitted by the primary fluor and emits photons of light at a wavelength to which the X-ray film is sensitive. Preferred combinations of fluors for use in fluorography, which achieve good fluorescence in the range of sensitivity of commercial X-ray film, include suitable derivatives of 2,5-diphenyloxazole or P-terphenyl as secondary fluors, and water soluble naphthalene, anthracene and fluorene, etc., as primary flours.

Various additives may also be used for different applications. Acetic acid may be added to either (or both) solutions to help fix the radioactivity in the gel. Antioxidants may be added to the formulation for stability. A disinfectant may be added to the formulation to discourage growth in the aqueous formulation. Plasticizers such as polyethyleneglycol or glycerol may be added for ease of gel handling as an anti-swelling agents.

The present invention will be further understood with reference to the following illustrative embodiments, which are exemplary only, and not be be taken as limiting the invention. In the following experiments, three different electrophoresis systems were used. These are common systems familiar to all researchers who do gel electrophoresis.

EXAMPLE I

SDS-Page Gel Electrophoresis

Sodium dodecyl sulfate-polyacrylamide gel electrophoresis (SDS-PAGE) was carried out according to the Laemmli system (Laemmli, U.M., Nature (London) 227,680 (1970)) with a 4% stacking slab gel (4 cm $\times$ 14 cm) and a 10% separating slab gel 12 cm $\times$ 14 cm). Gel thickness was either 1.5 mm or 0.75 mm. The gels were cast and run at 125 volts using the "Bio-Rad" Protean TM Slab Cell system.

The sample tested was a $^3$H-protein mix of bovine serum albumin, ovalbumin, carbonic anhydrase and cytochrome C. The mix was diluted 1:2 with the following sample buffer: 0.125M tris-HCl pH 6.8, 4% sodium docedyl sulfate, 20% glycerol, 10% $\beta$-mercaptoethanol, 0.05% bromophenol blue. The sample was boiled for 1 minute and then cooled. 300 nCi, 200 nCi, 100 nCi and 50 nCi aliquots were placed into the sample wells and the electrophoresis started.

After electrophoresis the gels were soaked in the appropriate fluor and precipitator solution, and then dried on a "Bio-Rad" slab gel dryer for 1½ hours.

The gels were autoradiographed by exposure of the impregnated gels to an 8"$\times$10" sheet of KODAK XAR-5 X-ray film at $-78°$ C. for 24 hours.

Preparation of naphthalene-Sulfonic Acid Ammonium Salt 250g of 2-naphthalene-sulfonic acid (Eastman Kodak) was dissolved in 350 cc of distilled water. Concentrated ammonium hydroxide (150 cc) was added and the resulting solution was treated with activated charcoal, heated and then filtered. The water was then pulled off and the residue was dissolved in hot methanol. Upon cooling, the product crystallized out and the resulting mixture was filtered. The supernatant was concentrated, cooled and filtered again to remove more crystallized product. The residual liquid was concentrated again and ethanol was added to it. The resulting precipitate was filtered and the liquid was evaporated to dryness resulting in more ammonium salt. The total yield of naphthalene-sulfonic acid ammonium salt isomers was 240 g.

SDS-PAGE was carried out as described above. The gels were soaked separately in the following solution combinations:

(A) 2% poly(ethyleneimine)-1800 followed by 400mM 2-naphthalene sulfonic acid ammonium salt and 20mM 4-[5-(2-phenyloxazolyl)]benzene sulfonic acid ammonium salt.

(B) 2% poly(ethyleneimine)-1800 and 5% acetic acid followed by 400mM 2-napthalene sulfonic acid ammonium salt and 20mM 4-[5-(2-phenyloxazolyl)] benzene sulfonic acid ammonium salt.

(C) 2% poly(ethyleneimine)-1800 and 5% acetic acid followed by 400mM 2-napthalene sulfonic acid ammonium salt, 20mM 4-[5-(2-phenyloxazolyl)] benzene sulfonic acid ammonium salt, 5% acetic acid and 2% polyethylene glycol 4000.

(D) 2% poly(ethyleneimine)-1800 and 5% acetic acid followed by 300mM 2-napthalene sulfonic acid ammonium salt, 15mM 4-[5-(2-phenyloxazolyl)] benzene sulfonic acid ammonium salt, 5% acetic acid and 2% polyethylene glycol 4000.

(E) 2% poly(ethyleneimine)-1800 and 5% acetic acid followed by 200mM 2-naphthalene sulfonic acid ammonium salt, 10mM 4-[5-(2-phenyloxazolyl)] benzene sulfonic acid ammonium salt, 5% acetic acid and 2% polyethylene glycol 4000.

(F) 2% poly(ethyleneimine)-1800 and 5% acetic acid followed by 400mM 2-naphthalene sulfonic acid ammonium salt, 20mM 4-[5-(2phenyloxazolyl)] benzene sulfonic acid ammonium salt, 5% acetic acid and 2% polyethylene glycol 4000.

(G) 2% poly(ethyleneimine)-1800 and 5% acetic acid followed by 400mM 2-napthalene sulfonic acid ammonium salt, 20mM 4-[5-(2-phenyloxazolyl)] benzene sulfonic acid ammonium salt, 5% acetic acid and 2% polyethylene glycol 4000.

The gels impregnated with the solutions detailed above all exhibited excellent fluorographic enhancement, even over a wide range of fluor concentrations (20mM–400mM). Also, the enhancement of radioactivity was independent of presence of acetic acid, and isomers of naphthalene sulfonic acid (ammonium salt) were equally effective.

EXAMPLE II

In this example, radioactive DNA was detected using agarose slab gel electrophoresis. 1% and 2% agarose gels were made by dissolving 1 gram and 2 grams of agarose in 100ml of electrophoresis buffer, 40mM tris HCI pH 7.5, 10mM sodium acetate and 1mM EDTA (ethylene diamine tetraacetic acid dissodium salt), respectively. The samples, either $^{35}$S-Iambda DNA Hind III digest or $^{35}$S-phi X174 Hha I digest were diluted with sample buffer (0.18M tris-HC1 pH 7.5, 0.04M EDTA, 50% glycerol, 0.6% bromophenol blue and 0.6% xylene cyanol) to give radioactive concentrations of 4000 dpm/band, 2000 dpm/band, 1000 dpm/band and 500 dpm/band when aliquoted to the gel. The samples were electrophoresed at 100 volts until the bromophenol blue dye band had penetrated three quarters of the gel.

After electrophoresis the gels were soaked separately in the following fluor composition:

2% poly(ethyleneimine)-1800 and 5% acetic acid followed by 400mM 2-naphthalene sulfonic acid ammonium salt, 20mM 4-[5-(2-phenyloxazolyl)] benzene sulfonic acid ammonium salt, 5% acetic acid and 2% polyethylene glycol 4000.

The enhancement of the $^{35}$S signal was excellent.

EXAMPLE III

In this system, 3H-labeled DNA was detected using the fluor precipitator solutions described in Example II. The buffer used for 1% agarose gels in this example, however, contained 40mM tris(hydroxymethyl-)aminomethane, 10mM sodium acetate, 1mM ethylenediaminetetraacetic acid, disodium salt, and enough boric acid to lower the pH to 8.0. The DNA mixture separated in this system was E. I. DuPont/NEN Products' catalog NET-639. This product contains 6 tritium labelled DNA restrictions fragments. The buffer used for 2% agarose gels contained 90mM tris(hydroxymethyl)aminomethane, 2.5mM ethylenediaminetetraacetic acid, disodium salt, and enough boric acid to lower the pH to 8.3. The DNA mixture separated in this system was DuPont/NEN Products' catalog NET-644. This product contains 11 tritium labelled DNA restriction fragments. Typical samples were 15-40 nCi per sample well. Again, the enhancement of the $^3$H signal was excellent. The solution combinations below were also found to be operable in the practice of the subject invention.

1.
(A) 1M sodium salicylate
(B) 1M cadmium chloride 2.
(A) 10mM N-[4-2,5-diphenyloxazolyl)methyl]-trimethyl ammonium chloride
(B) 200Mm 2-naphthalene-sulfonic acid, sodium salt 3.
(A) 30mM N-[4-(2,5-diphenyloxazolyl)methyl]-trimethyl ammonium chloride
(B) 5% sodium dodecyl sulfate 4.
(A) 10mM N-[4-2,5-diphenyloxazolyl)methyl]-trimethyl ammonium chloride 200mM N-(2-naphthylmethyl)trimethyl ammonium chloride
(B) 200mM 2-naphthalene-sulfonic acid, sodium salt 5.
(A) 10mM N-(4-(2,5-diphenyloxazolyl)methyl)-trimethyl ammonium chloride 200mM N-(2-naphthylmethyl)trimethyl ammonium chloride
(B) 5% sodium dodecyl sulfate 6.
(A) 10mM 4-(5-(2-phenyloxazolyl)benzene sulfonic acid, sodium slat (also referred to as PPO-sulfonic acid) 200mM 2-naphthalone sulfonic acid, sodium salt
(B) 1M magnesium acetate 7.
(A) 20mM PPO-sulfonic acid, sodium salt 200mM 2-naphthalene sulfonic acid, sodium salt
(B) 1M magnesium acetate 8.
(A) 10mM P-terphenyl-trisulfonic acid, sodium salt 200mM−2-napthalene sulfonic acid, sodium salt
(B) 1M magnesium acetate 9.
(A) 20mM PPO-sulfonic acid, sodium salt 400mM 2-naphthalene sulfonic acid, sodium salt
(B) 1M magnesium acetate 1% glycerol 10.
(A) 20mM P-terphenyl trisulfonic acid, sodium salt 300mM−2-naphthalene sulfonic acid, sodium salt
(B) 1M zinc acetate 1% glycerol 11.
(A) 200mM 2-naphthalene sulfonic acid, sodium salt
(B) 0.4M magnesium acetate 12.
(A) 100mM 2-naphthalene sulfonic acid, sodium salt 100mM 1,5-naphthalene disulfonic acid, sodium salt
(B) 0.4M magnesium acetate 13.
(A) 100mM 2-naphthalene sulfonic acid, sodium salt 100mM 2,6-naphthalene disulfonic acid, sodium salt
(B) 0.4M magnesium acetate 14.
(A) 100mM 2-naphthalene sulfonic acid, sodium salt 100mM 2,7-naphthalene disulfonic acid, sodium salt
(B) 0.4M magnesium acetate 15.
(A) 15% PPO-sulfonic acid, ammonium salt
(B) 1M magnesium acetate 16.
(A) 0.5M 2-naphthalene sulfonic acid, ammonium salt
(B) 1M magnesium acetate 17.
(A) 10mM PPO-sulfonic acid, sodium salt 200mM 5-(1,2,4-trimethylbenzene)sulfonic acid, trimethyl ammonium salt
(B) 0.8M magnesium acetate 18.
(A) 10mM PPO-sulfonic acid, sodium salt 200mM 5-(1,2,4-trimethylbenzene)sulfonic acid, sodium salt
(B) 0.8M magnesium acetate 19.
(A) 10mM PPO-sulfonic acid, sodium salt 200mM 5-(1,2,4-trimethylbenzene)sulfonic acid, ammonium salt
(B) 0.8M magnesium acetate 20.
(A) 10mM PPO-sulfonic acid, sodium salt 200mM dixylylethane sulfonic acid, sodium salt (B) 0.8M magnesium acetate 21.
(A) 20mM PPO-sulfonic acid, ammonium salt 200mM 2-naphthalene sulfonic acid, ammonium salt
(B) 0.8M zinc acetate 22.
(A) 10mM PPO-sulfonic acid, sodium salt 200mM 2-naphthalene sulfonic acid, sodium salt 5% acetic acid
(B) 0.4M magnesium acetate 5% acetic acid 23.
(A) 20mM PPO-sulfonic acid, ammonium salt 2-naphthalene sulfonic acid, ammonium salt 5% acetic acid
(B) 0.9M zinc acetate 5% acetic acid 24.
(A) 40mM PPO-sulfonic acid, ammonium salt 800mM 2-naphthalene sulfonic acid, ammonium salt 10% acetic acid
(B) 0.8M zinc acetate 5% acetic acid 25.
(A) 20mM PPO-sulfonic acid, ammonium salt 400mM 2-naphthalene sulfonic acid, ammonium salt
(B) 0.8M zinc acetate 5% acetic acid 26.
(A) 20mM PPO-sulfonic acid, sodium salt 400mM 2-naphthalene sulfonic acid, sodium salt
(B) saturated sodium chloride 27.
(A) 10mM PPO-sulfonic acid, sodium salt 200mM 2-naphthalene sulfonic acid, sodium salt
(B) $CH_3(CH_2)_{15}N^+(CH_3)_3BR^-$ 28.
(A) 10mM PPO-sulfonic acid, sodium salt 200mM 2-naphthalene sulfonic acid, sodium salt
(B) $C_6H_5N^+(CH_3)_2CH_2CH_2N^+(CH_3)_2C_6H_5.2Cl^-$ 29.
(A) 10mM PPO-sulfonic acid, sodium salt 200mM 2-naphthalene sulfonic acid, sodium salt
(B) 200mM N-(2-naphthylmethyl)trimethyl ammonium chloride 30.
(A) 1% Poly(ethyleneimine) MW 1,800 (also known as PEI) 2.8% acetic acid
(B) 20mM PPO-sulfonic acid, ammonium salt 400mM 2-naphthalene sulfonic acid, ammonium salt 420mM acetic acid 31.
(A) 1% PEI 2.8% acetic acid
(B) 20mM PPO-sulfonic acid, ammonium salt 400mM 2-naphthalene sulfonic acid, ammonium salt 5% acetic acid 32.
(A) 1% PEI 5% acetic acid
(B) 20mM PPO-sulfonic acid, ammonium salt 400mM 2-naphthalene sulfonic acid, ammonium salt 0.1% 4,4'(1,4-phenylene bis(2,5-oxazolediyl))bis benzene sulfonic acid 5% acetic acid 33.
(A) 20mM PPO-sulfonic acid, ammonium salt 400mM 2-naphthalene sulfonic acid, ammonium salt 5% acetic acid
(B) 1% PEI 5% acetic acid 34.
(A) 2% PEI 5% acetic acid
(B) 20mM PPO-sulfonic acid, ammonium salt 400mM 2-naphthalene sulfonic acid, ammonium salt 5% acetic acid 35.
(A) 4% PEI 10% acetic acid
(B) 20mM PPO-sulfonic acid, ammonium salt 400mM 2-naphthalene sulfonic acid, ammonium salt 5% acetic acid 36.
(A) 1% PEI 5% acetic acid
(B) 20mM PPO-sulfonic acid, ammonium salt 400mM 2-naphthalene sulfonic acid, ammonium salt 5% acetic acid 5% polyethylene glycol MW 4,000

37.
(A) 1% PEI MW 1,200 5% acetic acid
(B) 20mM PPO-sulfonic acid, ammonium salt 400mM 2-naphthalene sulfonic acid, ammonium salt 5% acetic acid 5% polyethylene glycol MW 4,000

38.
(A) 1% PEI MW 600 5% acetic acid
(B) 20mM PPO-sulfonic acid, ammonium salt 400mM 2-naphthalene sulfonic acid, ammonium salt 5% acetic acid 5% polyethylene glycol MW 4,000

What is claimed is:

1. An autofluorography composition comprising:
(i) a first aqueous solution of a water soluble fluor having a formula selected from $R-CO_2X$; $R-SO_3X$; and $R-^+NH_3Y^-$; where R is a fluor molecule, X is a cation and Y is an anion, which with their respective R counterions are ionized in water to impart water solubility; and
(ii) a second aqueous solution of a precipitator reagent capable of reacting with R in (i) to precipitate on insoluble fluor or an insoluble fluor salt in and to impregnate an electrophoresis gel matrix which when
(a) the water soluble fluor is $R-CO_2X$ or $R-SO_3X$ the precipitator reagent is selected from $MgZ_2$, $CaZ_2$, $BaZ_2$, $CdZ_2$, $NH_4Z_2$, NaZ, $ZnZ_2$ (where Z is Cl or OAc); poly(ethyleneimine); N-[4-(2,5-diphenyloxazolyl)-methyl]-ammonium chloride; N-(1-naphthyl-methyl) trimethylammonium chloride; and N-[4-(2,5-diphenyl-oxazolyl)methyl]-trimethyl ammonium chloride; and
(b) the water soluble fluor is $R-^+NH_3Y^-$ the precipitator reagent is selected from $R^1-CO_2X$ and $R^1-SO_3X$ where $R^1$ is a fluor or sodium dodecyl sulfate.

2. The composition of claim 1 wherein R is selected from 2,5-diphenyloxazole, naphthalene, terphenyl, fluorene and sodium salicylate.

3. The composition of claim 1 wherein the water soluble fluor is selected from 4-[5-(2-phenyloxazolyl)] benzene sulfonic acid (ammonium salt) and 2-naphthalene-sulfonic acid (ammonium salt); and wherein the precipitator reagent is poly(ethyleneimine).

* * * * *